(12) United States Patent
Blackburn et al.

(10) Patent No.: US 7,736,727 B2
(45) Date of Patent: Jun. 15, 2010

(54) ELECTRICALLY INSULATING FILM AND METHOD

(75) Inventors: Sapna Blackburn, Mount Vernon, IN (US); Scott Michael Fisher, Delmar, NY (US); Kwan Hongladarom, Mt. Vernon, IN (US); Robert John Hossan, Delmar, NY (US)

(73) Assignee: SABIC Innovative Plastics IP B.V. (NL)

( * ) Notice: Subject to any disclaimer, the term of this patent is extended or adjusted under 35 U.S.C. 154(b) by 561 days.

(21) Appl. No.: 11/678,299

(22) Filed: Feb. 23, 2007

(65) Prior Publication Data

US 2008/0203366 A1 Aug. 28, 2008

(51) Int. Cl.
*B32B 7/00* (2006.01)
(52) U.S. Cl. .............. 428/212; 428/220; 428/411.1; 428/483; 252/609
(58) Field of Classification Search ............. 428/212, 428/220, 411.1, 483; 252/609
See application file for complete search history.

(56) References Cited

U.S. PATENT DOCUMENTS

| | | | |
|---|---|---|---|
| 5,518,817 | A | 5/1996 | Yamasaki et al. |
| 6,204,315 | B1 | 3/2001 | Weber et al. |
| 7,087,682 | B2 | 8/2006 | Tadros et al. |
| 2003/0175488 | A1 | 9/2003 | Asthana et al. |
| 2006/0038314 | A1 | 2/2006 | Capaldo et al. |

FOREIGN PATENT DOCUMENTS

| | | |
|---|---|---|
| EP | 0639620 A2 | 2/1995 |
| EP | 1863037 A1 | 12/2007 |
| WO | 2008/060738 A1 | 5/2008 |

OTHER PUBLICATIONS

International Searching Authority, International Search Report, PCT/US2008/053256, International Filing Date Jul. 2, 2008, Mailing date Aug. 22, 2008, 6 pages.
International Searching Authority, Written Opinion, PCT/US2008/053256, International Filing Date Jul. 2, 2008, Mailing date: Aug. 22, 2008, 6 pages.
ASTM D1204-02 Standard Test Method for Linear Dimensional Changes of Nonrigid Thermoplastic Sheeting or Film at Elevated Temperature 2 pages).
ASTM D1922-06a Standard Test Method for Propagation Tear Resistance of Plastic Film and Thin Sheeting by Pendulum Method (7 pages).
ASTM D1004-03 Standard Test Method for Tear Resistance (Graves Tear) of Plastic Film and Sheeting (4 pages).
ASTM D3763-06 Standard Test Method for High Speed Puncture Properties of Plastics Using Load and Displacement Sensors (9 pages).
ASTM D3418-03 Standard Test Method for Transition Temperatures and Enthalipies of Fusion and Crystallization of Polymers by Differential Scanning Calorimetry (7 pages).
ASTM D150-98 Standard Test Methods for AC Loss Characteristics and Permittivity (Dielectric Constant) of Solid Electrical Insulation (20 pages).
ASTM D2176-97a (Reapproved 2002) Standard Test Method for Folding Endurance of Paper by the M.I.T. Tester (3 pages).
ASTM D523-89 (Reapproved 1999) Standard Test Method for Specular Gloss (5 pages).
ASTM D570-98 Standard Test Method for Water Absorption of Plastics (4 pages).
ASTM D792-00 Standard Test Methods for Density and Specific Gravity (Relative Density) of Plastics by Displacement (6 pages).
R. Scherrer in H. Zweifel, ed., "Plastics Additives Handbook", 5th Edition, Cincinatti, 2001, pp. 822-836.
ASTM D1204-02 Standard Test Method for Linear Dimensional Changes of Nonrigid Thermoplastic Sheeting or Film at Elevated Temperature 2 pages), Jan. 2003.
ASTM D1922-06a Standard Test Method for Propagation Tear Resistance of Plastic Film and Thin Sheeting by Pendulum Method (7 pages), Apr. 2006.
ASTM D1004-03 Standard Test Method for Tear Resistance (Graves Tear) of Plastic Film and Sheeting (4 pages), Oct. 2003.
ASTM D3763-06 Standard Test Method for High Speed Puncture Properties of Plastics Using Load and Displacement Sensors (9 pages), Sep. 2006.
UL 94 Tests for Flammability of Plastic Materials for Parts in Devices and Appliances; Last Revised Dec. 12, 2003 (52 pages).
ASTM D149-97a (Reapproved 2004) Standard Test Method for Dielectric Breakdown Voltage and Dielectric Strength of Solid Electrical Insulating Materials at Commercial Power Frequencies (13 pages).
ASTM D3418-03 Standard Test Method for Transition Temperatures and Enthalipies of Fusion and Crystallization of Polymers by Differential Scanning Calorimetry (7 pages), Jan. 2004.
ASTM D150-98 Standard Test Methods for AC Loss Characteristics and Permittivity (Dielectric Constant) of Solid Electrical Insulation (20 pages), Mar. 2004.
ASTM D570-98 Standard Test Method for Water Absorption of Plastics (4 pages), Jan. 1999.
ASTM D792-00 Standard Test Methods for Density and Specific Gravity (Relative Density) of Plastics by Displacement (6 pages), Mar. 2001.

*Primary Examiner*—David R Sample
*Assistant Examiner*—Lawrence D Ferguson
(74) *Attorney, Agent, or Firm*—Cantor Colburn LLP

(57) ABSTRACT

A halogen-free electrically insulating film is prepared from a composition including particular amounts of a poly(arylene ether), a hydrogenated block copolymer of an alkenyl aromatic compound and a conjugated diene, and a triaryl phosphate. The electrically insulating film may be prepared by an extrusion and/or calendering method. Uses of the electrically insulating film include, for example, shielding applications in power supply housing, printed circuit board insulation, backlit aircraft in flight panels and displays, business equipment insulation, computer rack partitions, and television and monitor insulation.

3 Claims, No Drawings

ELECTRICALLY INSULATING FILM AND METHOD

BACKGROUND OF THE INVENTION

Electrical insulation films are thin plastic sheets that are found in electronic components for computers, laptops, printers, fax machines, appliances, audio equipment, video equipment, telephones, radios, motors, generators, wires, cables, and the like. In order to function properly, electrical insulation films must be flame retardant. In particular, they must pass objective flame resistance tests such as those described in Underwriter's Laboratory Standard UL 94, "Tests for Flammability of Plastic Materials for Parts in Devices and Appliances". Historically, it has been difficult for electrical insulation materials to achieve the required UL 94 ratings without incorporating halogenated flame retardants in the composition used to make the electrical insulation film.

However, recently there has been a desire to reduce or eliminate halogenated components used in electronics and electrical devices. A number of countries have adopted the Waste in Electrical and Electronic Equipment Directive (WEEE) and/or the Restriction of Hazardous Substances Directive (RoHS). WEEE addresses toxic electronic waste and sets recycling and recovery targets for electrical equipment while RoHS restricts the use of hazardous materials in the manufacture of electronic and electrical devices. The incorporation of halogenated flame retardants in electrical insulation materials has made them difficult to recycle. With pressure to eliminate halogenated flame retardants in order to improve the recyclability and environmental safety of electric insulation films, there is a real need for plastic insulation films with good flame retardancy performance that do not contain halogenated flame retardants. In addition to being flame retardant and electrically insulating, the electrically insulating films must be esthetically pleasing and have good general workability. Workability refers to a film's ability to be cut into various shapes and sizes without fracture, and its ability to be fabricated via either cut-score or crease-score and folded into three-dimensional shapes. It has been very difficult to satisfy all these performance requirements with a halogen-free electrically insulating film.

BRIEF DESCRIPTION OF THE INVENTION

The above-described and other drawbacks are alleviated by an electrically insulating film, comprising: about 60 to about 93 weight percent of a poly(arylene ether); about 3 to about 15 weight percent of a hydrogenated block copolymer of an alkenyl aromatic compound and a conjugated diene; and about 4 to about 15 weight percent of a triaryl phosphate; wherein the electrically insulating film is halogen-free; wherein the electrically insulating film has a thickness of about 50 to about 1050 micrometers; and wherein the electrically insulating film exhibits a flammability rating of VTM-0 measured according to according to the UL 94 Thin Material Vertical Burning Test at a thickness of 51 micrometers, a flammability rating of V-0 measured according to the UL 94 Vertical Burning Test at a thickness of 254 micrometers, a glass transition temperature greater than or equal to 100° C., and a breakdown voltage greater than or equal to 14,000 volts measured at 23° C. in oil at a thickness of 254 micrometers according to ASTM D149.

Another embodiment is an electrically insulating film, comprising: about 80 to about 90 weight percent of a poly(2,6-dimethyl-1,4-phenylene ether) having an intrinsic viscosity of about 0.3 to about 0.6 deciliter per gram measured at 25° C. in chloroform; about 4 to about 7 weight percent of a polystyrene-poly(ethylene-butylene)-polystyrene triblock copolymer having a weight average molecular weight of about 200,000 to about 400,000 atomic mass units; about 6 to about 10 weight percent of resorcinol bis(diphenyl phosphate); about 0.5 to about 1 weight percent of a linear low density polyethylene; and about 0.2 to about 0.8 weight percent of carbon black; wherein the electrically insulating film has a thickness of about 50 to about 800 micrometers; and wherein the electrically insulating film exhibits a flammability rating of VTM-0 measured according to according to UL 94 at a thickness of 51 micrometers, a flammability rating of V-0 measured according to UL 94 at a thickness of 254 micrometers, a breakdown voltage greater than or equal to 14,000 volts measured at 23° C. in oil at a thickness of 254 micrometers according to ASTM D149, a Dynatup total energy value of about 2 to about 2.3 joules measured at a thickness of 254 micrometers according to ASTM D3763, and a fold endurance of about 80 to about 100 double folds in the machine direction measured at a thickness of 254 micrometers according to ASTM D2176.

Another embodiment is a method of forming an electrically insulating film, comprising: extruding or calendering a composition comprising about 60 to about 93 weight percent of a poly(arylene ether), about 3 to about 15 weight percent of a hydrogenated block copolymer of an alkenyl aromatic compound and a conjugated diene, and about 4 to about 15 weight percent of a triaryl phosphate; wherein the electrically insulating film is halogen-free; wherein the electrically insulating film has a thickness of about 50 to about 1050 micrometers; and wherein the electrically insulating film exhibits a flammability rating of VTM-0 measured according to according to the UL 94 Thin Material Vertical Burning Test at a thickness of 51 micrometers, a flammability rating of V-0 measured according to the UL 94 Vertical Burning Test at a thickness of 254 micrometers, and a glass transition temperature greater than or equal to 100° C., and a breakdown voltage greater than or equal to 14,000 volts measured at 23° C. in oil at a thickness of 254 micrometers according to ASTM D149.

Another embodiment is a method of forming an electrically insulating film, comprising: extruding a thermoplastic resin composition into a gap between a first calendering roll and a second calendering roll to produce a calendered film; and cooling the calendered film to a temperature less than or equal to 150° C.; wherein the thermoplastic resin composition comprises about 80 to about 90 weight percent of a poly(2,6-dimethyl-1,4-phenylene ether) having an intrinsic viscosity of about 0.3 to about 0.6 deciliter per gram measured at 25° C. in chloroform, about 4 to about 7 weight percent of a polystyrene-poly(ethylene-butylene)-polystyrene triblock copolymer having a weight average molecular weight of about 200,000 to about 400,000 atomic mass units, about 6 to about 10 weight percent of resorcinol bis(diphenyl phosphate), about 0.5 to about 1 weight percent of a linear low density polyethylene, and about 0.2 to about 0.8 weight percent of carbon black; wherein the thermoplastic composition is extruded at a temperature of about 230 to about 345° C.; wherein the first calendering roll or the second calendering roll or both have a surface temperature of about 40 to about 190° C.; wherein the electrically insulating film has a thickness of about 50 to about 800 micrometers; and wherein the electrically insulating film exhibits a flammability rating of VTM-0 measured according to according to UL 94 at a thickness of 51 micrometers, a flammability rating of V-0 measured according to UL 94 at a thickness of 254 micrometers, a breakdown voltage greater than or equal to 14,000 volts measured at 23° C. in oil at a thickness of 254 micrometers according to ASTM D149, a Dynatup total energy value of about 2 to about 2.3 joules measured at a thickness of 254 micrometers according to ASTM D3763, and a fold endurance of about 80 to about 100 double folds in the machine direction measured at a thickness of 254 micrometers according to ASTM D2176.

These and other embodiments are described in detail below.

DETAILED DESCRIPTION OF THE INVENTION

A halogen-free electrically insulating film meeting the myriad performance requirements of such films has been prepared from a composition comprising particular amounts of a poly(arylene ether), a hydrogenated block copolymer of an alkenyl aromatic compound and a conjugated diene, and a triaryl phosphate. The electrically insulating film having acceptable surface quality may be prepared by an extrusion and/or calendering methods.

One embodiment is an electrically insulating film, comprising: about 60 to about 93 weight percent of a poly(arylene ether); about 3 to about 15 weight percent of a hydrogenated block copolymer of an alkenyl aromatic compound and a conjugated diene; and about 4 to about 15 weight percent of a triaryl phosphate; wherein the electrically insulating film is halogen-free; wherein the electrically insulating film has a thickness of about 50 to about 1050 micrometers; and wherein the electrically insulating film exhibits a flammability rating of VTM-0 measured according to according to the UL 94 Thin Material Vertical Burning Test at a thickness of 51 micrometers, a flammability rating of V-0 measured according to the UL 94 Vertical Burning Test at a thickness of 254 micrometers, a glass transition temperature greater than or equal to 100° C., and a breakdown voltage greater than or equal to 14,000 volts measured at 23° C. in oil at a thickness of 254 micrometers according to ASTM D149.

The electrically insulating film comprises a poly(arylene ether). Suitable poly(arylene ether)s include those comprising repeating structural units having the formula

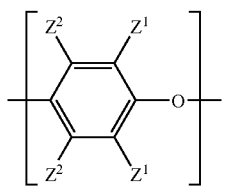

wherein for each structural unit, each $Z^1$ is independently $C_1$-$C_{12}$ hydrocarbylthio (that is, ($C_1$-$C_{12}$ hydrocarbyl)S—), $C_1$-$C_{12}$ hydrocarbyloxy, or unsubstituted or substituted $C_1$-$C_{12}$ hydrocarbyl provided that the hydrocarbyl group is not tertiary hydrocarbyl; and each $Z^2$ is independently hydrogen, $C_1$-$C_{12}$ hydrocarbylthio, $C_1$-$C_{12}$ hydrocarbyloxy, or unsubstituted or substituted $C_1$-$C_{12}$ hydrocarbyl provided that the hydrocarbyl group is not tertiary hydrocarbyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

In some embodiments, the poly(arylene ether) has an intrinsic viscosity of about 0.1 to about 1 deciliter per gram measured at 25° C. in chloroform. Specifically, the poly (arylene ether) intrinsic viscosity may be about 0.2 to about 0.8 deciliter per gram, more specifically about 0.3 to about 0.6 deciliter per gram.

The concentration of poly(arylene ether) in the electrically insulating film is about 60 to about 93 weight percent, based on the total weight of the electrically insulating film. Specifically, the poly(arylene ether) concentration may be about 70 to about 90 weight percent, more specifically about 75 to about 87 weight percent, still more specifically about 80 to about 87 weight percent.

In addition to the poly(arylene ether), the electrically insulating film comprises a hydrogenated block copolymer of an alkenyl aromatic compound and a conjugated diene. For brevity, this component is referred to herein as the "hydrogenated block copolymer". The hydrogenated block copolymer may comprise about 15 to about 80 weight percent of poly(alkenyl aromatic) content and about 20 to about 85 weight percent of hydrogenated poly(conjugated diene) content. In some embodiments, the poly(alkenyl aromatic) content is about 20 to 40 weight percent. In other embodiments, the poly(alkenyl aromatic) content is greater than 40 weight percent to about 90 weight percent, specifically about 55 to about 80 weight percent.

In some embodiments, the hydrogenated block copolymer has a weight average molecular weight of about 40,000 to about 400,000 atomic mass units. The number average molecular weight and the weight average molecular weight can be determined by gel permeation chromatography and based on comparison to polystyrene standards. In some embodiments, the hydrogenated block copolymer has a weight average molecular weight of 200,000 to about 400,000 atomic mass units, specifically about 220,000 to about 350,000 atomic mass units. In other embodiments, the hydrogenated block copolymer has a weight average molecular weight of about 40,000 to less than 200,000 atomic mass units, specifically about 40,000 to about 180,000 atomic mass units, more specifically about 40,000 to about 150,000 atomic mass units.

The alkenyl aromatic monomer used to prepare the hydrogenated block copolymer can have the structure

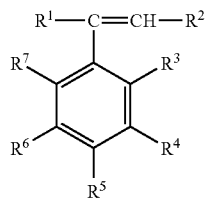

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ allyl group, or a $C_2$-$C_8$ alkenyl group, or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof. In some embodiments, the hydrogenated block copolymer is a polystyrene-poly(ethylene-butylene)-polystyrene triblock copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the hydrogenated block copolymer includes the residue of one or more acid functionalizing agents, such as maleic anhydride.

Methods of preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from AK Elastomer as TUFTEC H1043; the polystyrene-poly(ethylene-butylene)-polystyrene triblock copolymer comprising 42 weight percent polystyrene available from AK Elastomer as TUFTEC H1051; the polystyrene-poly(butadiene-butylene)-polystyrene triblock copolymers available from AK Elastomer as TUFTEC P1000 and P2000; the polystyrene-polybutadiene-poly(styrene-butadiene)-polybutadiene block copolymer available from AK Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more hydrogenated block copolymers may be used.

The electrically insulating film comprises the hydrogenated block copolymer at a concentration of about 3 to about 15 weight percent, based on the total weight of the film. Specifically, the hydrogenated block copolymer concentration may be about 4 to about 12 weight percent, more specifically about 5 to about 9 weight percent, still more specifically about 5 to about 6 weight percent.

In addition to the poly(arylene ether) and the hydrogenated block copolymer, the electrically insulating film comprises a triaryl phosphate. While not wishing to be bound by any particular mode of action, the present inventors believe that the triaryl phosphate functions as both a flame retardant and a plasticizer. Suitable triaryl phosphates include those having the structure

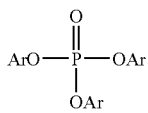

wherein each aryl group, Ar, is independently a directly bound $C_6$-$C_{12}$ aromatic group optionally substituted with one or more substituents selected from $C_1$-$C_{12}$ hydrocarbyl, $C_1$-$C_{12}$ hydrocarbyloxy, hydroxy, nitro, cyano, carboxy, and the like. Illustrative examples include triphenyl phosphate, tritolyl phosphate, isopropylated triphenyl phosphate, butylated triphenyl phosphate, and the like. Triaryl phosphates further include molecules wherein two or more diaryl phosphate groups are each bound to one or more aryl fragments of a linking group. Illustrative examples include resorcinol bis (diphenyl phosphate) ("RDP"; CAS Reg. No. 57583-54-7; Phosphoric acid, 1,3-phenylene tetraphenyl ester) and bisphenol A bis(diphenyl phosphate) ("BPADP"; CAS Reg. No. 5945-33-5; phosphoric acid, (1-methylethylidene)di-4,1-phenylene tetraphenyl ester). In some embodiments, the triaryl phosphate is resorcinol bis(diphenyl phosphate).

The electrically insulating film comprises the triaryl phosphate in a concentration of about 4 to about 15 weight percent, based on the total weight of the electrically insulating film. Specifically, the triaryl phosphate concentration may be about 5 to about 12 weight percent, more specifically about 6 to about 10 weight percent, still more specifically about 7 to about 9 weight percent.

In addition to the poly(arylene ether), the hydrogenated block copolymer, and the triaryl phosphate, the electrically insulating film may, optionally, further comprise a copolymer of ethylene and a $C_3$-$C_{12}$ alpha-olefin. For brevity, this component is sometimes referred to herein as an ethylene/alpha-olefin copolymer. The ethylene/alpha-olefin copolymer is defined herein as a copolymer comprising 25 to 95 weight percent, specifically 60 to 85 weight percent, of units derived from ethylene and 75 to 5 weight percent, specifically 40 to 15 weight percent, of units derived from a $C_3$-$C_{12}$ alpha-olefin. In some embodiments, the ethylene/alpha-olefin copolymer is a random copolymer such as, for example, ethylene-propylene rubber ("EPR"), linear low density polyethylene ("LLDPE"), or very low density polyethylene ("VLDPE"). In other embodiments, the ethylene/alpha-olefin copolymer is a block copolymer comprising at least one block consisting of ethylene homopolymer or propylene homopolymer and one block that is a random copolymer of ethylene and a $C_3$-$C_{12}$ alpha-olefin. Suitable alpha-olefins include propene, 1-butene, and 1-octene. In some embodiments, the ethylene/ alpha-olefin copolymer has a melt flow rate of about 1 to about 30 grams per 10 minutes, specifically about 10 to about 30 grams per 10 minutes, more specifically about 15 to about 25 grams per 10 minutes, measured at 190° C. and 2.16 kilogram load according to ASTM D1238-04c. In some embodiments, the ethylene/alpha-olefin copolymer has a density of about 0.8 to about 0.9 grams per milliliter. In some embodiments, the ethylene/alpha-olefin copolymer is a linear low density polyethylene.

When present, the copolymer of ethylene and a $C_3$-$C_{12}$ alpha-olefin is used at a concentration of about 0.1 to about 4 weight percent, specifically about 0.2 to about 3 weight percent, more specifically about 0.3 to about 2 weight percent, yet more specifically about 0.5 to about 0.7 weight percent, based on the total weight of the electrically insulating film.

The electrically insulating film may, optionally, further comprise a colorant. Carbon black is a suitable colorant. Other suitable colorants are described, for example, by R. Scherrer in H. Zweifel, ed., "Plastics Additives Handbook", 5th Edition, Cincinnati, 2001, pages 822-836. When present, the colorant may be used in an amount of about 0.1 to about 2 weight percent, specifically about 0.25 to about 1 weight percent, more specifically about 0.4 to about 0.7 weight percent, based on the total weight of the electrically insulating film.

The electrically insulating film is halogen-free. As used herein, the term "halogen-free" means that no halogen-containing component is intentionally added. In practice, a composition that comprises less than 100 parts per million by weight of total fluorine, chlorine, bromine, and iodine as determined, for example, by Inductively Coupled Plasma Atomic Absorption Spectroscopy is considered halogen-free. In some embodiments, the composition comprises less than 50 parts per million by weight of total fluorine, chlorine, bromine, and iodine.

The electrically insulating film typically has a thickness of about 50 to about 1050 micrometers. Specifically, the thickness may be about 50 to about 800 micrometers, more specifically about 200 to about 500 micrometers. Film thickness, sometimes referred to as nominal film thickness, may be determined using methods known in the art. For example, film thickness may be determined using a Mitutoyo 293-340 handheld digital micrometer. In some embodiments, the electrically insulating film consists of a single layer.

The film is electrically insulating. Specifically, it has a breakdown voltage greater than or equal to 14,000 volts measured at 23° C. and a thickness of 254 micrometers (10 mils) according to ASTM D149-97a. In some embodiments, the breakdown voltage is 14,000 to about 20,000 volts, specifically about 18,000 to about 20,000 volts. The electrically insulating property of the film may also be manifested as a dielectric constant less than or equal to 3 measured at 23° C., a thickness of 254 micrometers (10 mils), and a frequency of 1 megahertz according to ASTM D150-98 (2004). In some embodiments, the electrically insulating film has dielectric constant of about 2.5 to about 3. In some embodiments, the electrically insulating film exhibits a dissipation constant of about 0.0015 to about 0.0035 measured at 23° C., a film thickness of 254 micrometers (10 mils), and a frequency of 1 megahertz according to ASTM D150-98 (2004).

The electrically insulating film is flame retardant. Specifically, it exhibits a flammability rating of VTM-0 measured according to according to the UL 94 Thin Material Vertical Burning Test at a thickness of 51 micrometers (2 mils), and a flammability rating of V-0 measured according to the UL 94 Vertical Burning Test at a thickness of 254 micrometers (10 mils).

The electrically insulating film is heat resistant. Specifically, it exhibits a glass transition temperature greater than or equal to 100° C. measured according to ASTM D3418-03. In some embodiments, the glass transition temperature is 100 to about 180° C., specifically about 130 to about 175° C., more specifically about 145 to about 175° C., yet more specifically about 160 to about 175° C.

The electrically insulating film is puncture resistant. Thus, in some embodiments, the electrically insulating film exhibits a Dynatup Total Energy of at least 1.5 joules, specifically 1.5 to about 2.3 joules, measured at 23° C. and a thickness of 254 micrometers (10 mils) according to ASTM D3763-06.

The electrically insulating film is capable of being folded without breaking. Thus, in some embodiments, the electrically insulating film exhibits a fold endurance of at least 50 double folds, specifically about 50 to about 100 double fold, more specifically about 70 to about 100 double folds, still more specifically about 90 to about 100 double folds, measured at 23° C. and a thickness of 254 micrometers according to ASTM D2176-97a (2002).

One embodiment is an electrically insulating film, comprising: about 80 to about 90 weight percent of a poly(2,6-dimethyl-1,4-phenylene ether) having an intrinsic viscosity of about 0.3 to about 0.6 deciliter per gram measured at 25° C. in chloroform; about 4 to about 7 weight percent of a polystyrene-poly(ethylene-butylene)-polystyrene triblock copolymer having a weight average molecular weight of about 200,000 to about 400,000 atomic mass units; about 6 to about 10 weight percent of resorcinol bis(diphenyl phosphate); about 0.5 to about 1 weight percent of a linear low density polyethylene; and about 0.2 to about 0.8 weight percent of carbon black; wherein the electrically insulating film has a thickness of about 50 to about 800 micrometers; and wherein the electrically insulating film exhibits a flammability rating of VTM-0 measured according to according to UL 94 at a thickness of 51 micrometers, a flammability rating of V-0 measured according to UL 94 at a thickness of 254 micrometers, a breakdown voltage greater than or equal to 14,000 volts measured at 23° C. in oil at a thickness of 254 micrometers according to ASTM D149, a Dynatup total energy value of about 2 to about 2.3 joules measured at a thickness of 254 micrometers according to ASTM D3763, and a fold endurance of about 80 to about 100 double folds in the machine direction measured at a thickness of 254 micrometers according to ASTM D2176.

The invention includes methods of preparing the electrically insulating film. In some embodiments, the film is prepared by extrusion calendering. For example, a continuous calendering extrusion apparatus may comprise a melt delivery system with an extruder supplying molten resin to the die. The melt stream is then fed to a die, which forms a molten polymeric web that is transported to a set of calendering rolls. A calender typically consists of 2 to 4 counter rotating cylindrical rolls. These rolls are typically made from steel or rubber-covered steel, and they are internally temperature controlled via oil or water circulation. The molten web formed by the die is successively squeezed between the calender rolls. In some embodiments, the calender rolls include a textured steel roll sand-blasted to provide a random texture surface finish of 190-200 Ra, and a silicone rubber covered steel roll with the surface sand blasted to a random texture finish of 30-35 Ra. In other embodiments, mirror finish chrome polish rolls or other texturing rolls can also be used to generate a polish finish or desired textured finish. The inter-roll clearances or "nips" through which the polymers are drawn determine the thicknesses of the films. Suitable methods of preparing thermoplastic films are generally described in, for example, U.S. Pat. No. 7,087,682 to Tadros et al., and U.S. Patent Application Publication No. US 2006/0038314 A1 of Capaldo et al.

One embodiment is a method of forming an electrically insulating film, comprising: extruding or calendering a composition comprising about 60 to about 93 weight percent of a poly(arylene ether), about 3 to about 15 weight percent of a hydrogenated block copolymer of an alkenyl aromatic compound and a conjugated diene, and about 4 to about 15 weight percent of a triaryl phosphate; wherein the electrically insulating film is halogen-free; wherein the electrically insulating film has a thickness of about 50 to about 1050 micrometers; and wherein the electrically insulating film exhibits a flammability rating of VTM-0 measured according to according to the UL 94 Thin Material Vertical Burning Test at a thickness of 51 micrometers, a flammability rating of V-0 measured according to the UL 94 Vertical Burning Test at a thickness of 254 micrometers, and a glass transition temperature greater than or equal to 100° C., and a breakdown voltage greater than or equal to 14,000 volts measured at 23° C. in oil at a thickness of 254 micrometers according to ASTM D149.

Another embodiment is a method of forming an electrically insulating film, comprising: extruding a thermoplastic resin composition into a gap between a first calendering roll and a second calendering roll to produce a calendered film; and cooling the calendered film to a temperature less than or equal to 150° C.; wherein the thermoplastic resin composition comprises about 80 to about 90 weight percent of a poly(2,6-dimethyl-1,4-phenylene ether) having an intrinsic viscosity of about 0.3 to about 0.6 deciliter per gram measured at 25° C. in chloroform, about 4 to about 7 weight percent of a polystyrene-poly(ethylene-butylene)-polystyrene triblock copolymer having a weight average molecular weight of about 200,000 to about 400,000 atomic mass units, about 6 to about 10 weight percent of resorcinol bis(diphenyl phosphate), about 0.5 to about 1 weight percent of a linear low density polyethylene, and about 0.2 to about 0.8 weight percent of carbon black; wherein the thermoplastic composition is extruded at a temperature of about 230 to about 345° C.; wherein the first calendering roll or the second calendering roll or both have a surface temperature of about 40 to about 190° C.; wherein the electrically insulating film has a thickness of about 50 to about 800 micrometers; and wherein the electrically insulating film exhibits a flammability rating of VTM-0 measured according to according to UL 94 at a thickness of 51 micrometers, a flammability rating of V-0 measured according to UL 94 at a thickness of 254 micrometers, a breakdown voltage greater than or equal to 14,000 volts measured at 23° C. in oil at a thickness of 254 micrometers according to ASTM D149, a Dynatup total energy value of about 2 to about 2.3 joules measured at a thickness of 254 micrometers according to ASTM D3763, and a fold endurance of about 80 to about 100 double folds in the machine direction measured at a thickness of 254 micrometers according to ASTM D2176.

Uses of the electrically insulating film include shielding applications in power supply housing, printed circuit board insulation, backlit aircraft in flight panels and displays, business equipment insulation, computer rack partitions, and television and monitor insulation.

The invention is further illustrated by the following non-limiting examples.

Examples 1-3

These examples illustrate preparation of monolayer halogen-free, poly(arylene ether)-containing films with both sides textured. The textures on the monolithic film were created via calendering processing using a steel textured roll and a rubber textured roll. Films with nominal thicknesses of 6 mils (152 micrometers), 10 mils (254 micrometers) and 17 mils (432 micrometers) were prepared. The stated thickness for each film in Table 1 represents the average, to the nearest mil, of several thickness measurement on the film, and the average thickness value in mils was then converted to micrometers using the conversion factor of 25.4 micrometers per mil.

The film composition is detailed in Table 1, where all component amounts are in weight percent based on the total weight of the composition. The poly(arylene ether) was a poly(2,6-dimethyl-1,4-phenylene ether) having an intrinsic viscosity of 0.46 deciliter per gram measured at 25° C. in chloroform, obtained from GE Plastics as PPO 646 ("PPE" in Table 1). The hydrogenated block copolymer was a polystyrene-poly(ethylene-butylene)-polystyrene triblock copolymer having a polystyrene content of 31 weight percent and a weight average molecular weight of about 240,000 to about 301,000 atomic mass units obtained as KRATON G1651 from Kraton Polymers ("SEBS" in Table 1). The triaryl phosphate flame retardant was resorcinol bis(diphenyl phosphate) obtained as Fyrolflex RDP from Supresta ("RDP" in Table 1). The linear low density polyethylene having a melt flow index of about 20 grams per 10 minutes measured at 190° C. and a 2.16 kilogram load was obtained as ESCORENE LL 5100.09 from ExxonMobil ("LLDPE" in Table 1). Pentaerythritol tetrakis(β-lauryl thiopropionate) (CAS Reg. No. 29598-76-3) was obtained as SEENOX 412S from Shipro Kasei Kaisha. The carbon black was obtained as Vulcan 9A32 from Cabot Corporation.

TABLE 1

| Component | Amount (wt %) |
| --- | --- |
| PPE | 84.1 |
| SEBS | 5.5 |
| RDP | 7.8 |
| Zinc sulfide | 0.1 |
| Pentaerythritol tetrakis(β-lauryl thiopropionate) | 1.1 |
| LLDPE | 0.6 |
| Magnesium oxide | 0.3 |
| Carbon black | 0.5 |

All components were pre-compounded on an 11-barrel twin-screw extruder and pelletized. The extruder temperatures from the first barrel to the die were 65, 175, 250, 250, 250, 250, 250, 250, 250, 250, 250, and 290° C. The extrudate was pelletized and dried. The pellets were then fed into a single-screw extruder. The single screw extruder had barrel temperatures set at 254, 260, 270, 275, and 288° C. The molten polymer from the single screw extruder in turn fed a flexible lip die that formed a molten polymer web. The temperature of the die is set from 290° C. to 305° C. The web is fed into two calendering roll mills. The two rolls included a textured steel roll that was sand-blasted to matte texture surface finish at 190-200 Ra and a silicone rubber covered roll with sand blasted surface of 30-35 Ra. The surfaces of the roll mill are held at the temperature less than or equal to the glass transition temperature of the polymer. In these experiments, the temperature of the steel textured roll was set at approximately 150° C. to 165° C. The rubber roll surface temperature was set at approximately 130° C. to 140° C. The films obtained from the method described had textured surfaces with different matte finishes on the two surfaces of the film. The sides that were textured by matte steel rolls exhibited a 60 degree gloss value of 11.7 measured according to ASTM D523-89 (1999). The sides that were textured by matte rubber rolls exhibited a 60 degree gloss value of 7.7 measured according to ASTM D523-89 (1999). The pressure between the nips of the two rolls was adjusted so that the surface textures for both sides have a uniform matte appearance.

Film properties are presented in Table 2. Film thickness values (measured in mils but expressed in micrometers) were measured by a Mitutoyo 293-340 handheld digital micrometer. Tensile strength values and tensile modulus values (both expressed in megapascals) were measured at 23° C. according to ASTM D882-02. Initiation tear strength values (expressed in newtons per millimeter) were determined at 23° C. according to ASTM D1004-03. Propagation tear strength values (expressed in newtons per millimeter) were determined at 23° C. according to ASTM D1922-06a. Dynatup total energy values (expressed in joules), which are a measure of puncture resistance, were measured at 23° C. according to ASTM D3763-06. Fold endurance (expressed as the number of double folds made before fracture) was measured in the machine direction ("MD" in Table 2) and the transverse direction ("TD" in Table 2) at 23° C. according to ASTM D2176-97a (2002). Glass transition temperature values (expressed in degrees centigrade) were measured according to ASTM D3418-03. Shrinkage values (expressed in percent) were measured at 130° C. according to ASTM D1204-02.

Flammability values were measured according to UL 94 (Dec. 12, 2003) using the Thin Material Vertical Burning Test. In this test, a 200±5 millimeter long by 50±1 millimeter wide specimen is wrapped longitudinally around a 13 millimeter diameter mandrel. Five such specimens are tested for each material. A rating of VTM-0 requires that each individual specimen has a first a second flame-out time less than or equal to 10 seconds; the total of first and second flame-out times ($t_1$ and $t_2$) for all five specimens is less than or equal to 50 seconds; that the afterflame ($t_2$) plus afterglow ($t_3$) times for each individual specimen is less than or equal to 30 seconds; that no specimen exhibits an afterflame or afterglow up to the 125 millimeter mark; and that the cotton indicator is not ignited by flaming particles or drops. Films of various thicknesses were tested. Table 2 shows the thickness of the thinnest film to achieve a VTM-0 rating. For the Table 1 composition, the thinnest film tested, a 2 mil (51 micrometer) film, achieved the VTM-0 rating.

Density values (expressed in kilograms per cubic meter) were measured at 23° C. according to ASTM D792-00. Water absorption values (expressed as a percent change in weight relative to the starting weight) were measured according to ASTM D570-98 (2005) at two conditions: 24 hour water immersion at 23° C., and 24 hours at 23° C. and 50% relative humidity. Dielectric strength values (expressed in kilovolts per millimeter) and breakdown voltage (expressed in volts) were measured in oil at 23° C. according to ASTM D149-97a, Method A. Dielectric constant values and dissipation constant values (both of which are unitless) were measured at 23° C. according to ASTM D150-98 (2004).

TABLE 2

| | Example 1 | Example 2 | Example 3 |
| --- | --- | --- | --- |
| Thickness (micrometers) | 152 | 254 | 432 |
| Mechanical Properties | | | |
| Tensile Strength (MPa) | 56 | 64 | 61 |
| Tensile Modulus (MPa) | 1890 | 2031 | 1950 |
| Initiation Tear Strength (N/mm) | 214 | 210 | 160 |
| Propagation Tear Strength (N/mm) | 6.5 | 8.8 | 14 |
| Dynatup Total Energy (J) | 1.22 | 2.16 | 3.46 |
| Fold Endurance (double folds) | | | |
| MD | 1186 | 95 | 10 |
| TD | 1557 | 703 | 12 |
| Thermal Properties | | | |
| Glass Transition Temperature (° C.) | 172 | 172 | 172 |
| Shrinkage at 130° C. (%) | 0.13 | 0.13 | 0.1 |
| Rating in UL94 Thin Material Vertical Burning Test | VTM-0 at 51 μm | VTM-0 at 51 μm | VTM-0 at 51 μm |
| Physical Properties | | | |
| Density (kg/m³) | 1100 | 1100 | 1100 |
| Water Absorption, 23° C., 24 hrs Immersed (%) | 0.32 | 0.41 | 0.46 |
| Water Absorption, 23° C., 50% RH, 24 hrs (%) | 0.07 | 0.07 | 0.08 |

TABLE 2-continued

|  | Example 1 | Example 2 | Example 3 |
|---|---|---|---|
| Electrical Properties | | | |
| Dielectric Strength in oil, short time @ 23° C. (kV/mm) | 85 | 74 | 49 |
| Breakdown Voltage in oil @ 23° C. (V) | 14840 | 19380 | 21440 |
| Dielectric Constant @ 1,000,000 Hz | 2.6 | 2.7 | 2.7 |
| Dissipation Factor @ 1,000,000 Hz | 0.0019 | 0.0034 | 0.0030 |

The physical properties including the tensile strength, tear strength, and puncture resistance have acceptable performance for insulation film applications. The films exhibited improved fold endurance at lower thicknesses. Six mil (152 micrometer) films are able to be double folded over 1000 times, while 10 mil (254 micrometer) films are able to be folded approximately 100 times before fracture, and 17 mil (432 micrometer) films can be folded approximately 10 times before fracture. This is adequate for electrical film insulation applications where the one or two folds are typically employed.

The films also have good heat resistance and excellent flame retardant performance. The composition exhibited the excellent UL 94 VTM-0 rating at thicknesses of 2 mils and 6 mils. At thicknesses of 10 and 17 mils, the UL 94 Vertical Burning Test could be conducted, and top ratings of V-0 were achieved. The glass transition temperature of the composition was 172° C. The dielectric strength, breakdown voltage, dielectric constant, and dissipation factor values are acceptable for electrical insulation applications.

Examples 4-8

These examples illustrate that the optional use of a linear low density polyethylene in the composition can reduce film defects created during extrusion. During extrusion calendering of certain compositions, it was sometimes noted that degraded polymeric material built up on the die lip. The build up on the die lip could eventually grow to drag and mar the surface of the molten polymeric web as the web was extruded through the die. This led to the creation of drag-lines or die-lines that permanently scarred the final film. To reduce die lip build-up, five compositions were prepared varying in the concentration of linear low density polyethylene. The linear low density polyethylene described for Examples 1-3 was incorporated at levels of 0, 0.6, 0.9, 1.6, and 2.4 weight percent based on the total weight of the composition. These compositions were tested by running the resin through an extrusion calendering process continuously for three hours. The die build up was monitored and resulting films were visually inspected for defects associated with die lip build-up. The compositions were then rated on a 1 to 5 scale, with a "5" rating indicating minimal die lines and minimal die lip build-up and a "1" rating indicating many distinct die lines and a large amount of die lip built-up. The results, presented in Table 3, show that the optimal concentration of linear low density polyethylene is approximately 0.6 to 0.9 weight percent.

TABLE 3

|  | LLDPE conc. (wt %) | Visual Rating |
|---|---|---|
| Example 4 | 0 | 1 |
| Example 5 | 0.6 | 5 |
| Example 6 | 0.9 | 5 |
| Example 7 | 1.6 | 4 |
| Example 8 | 2.4 | 3 |

Example 9

Comparative Examples 1 and 2

These examples compare the performance of electrically insulating films based on a halogen-free poly(arylene ether) composition and polycarbonate and polypropylene compositions with halogenated flame retardants. Flame retardant polycarbonate (FR-PC) films and flame retardant polypropylene (FR-PP) films are used extensively in a wide range of electrical, electronic insulation film applications. Both FR-PP films and FR-PC films meet the stringent requirements of UL94 VTM-0 and UL 94 V-0 by incorporating brominated flame retardant additives.

Table 4 provides property comparisons for three films. Comparative Example 1 is based on polypropylene with a halogenated flame retardant and was obtained as Formex GK17 manufactured by ITW. Some of the data presented for the Formex GK17 film were obtained from a data sheet provided by the supplier. Comparative Example 2 is based on polycarbonate with a halogenated flame retardant and was obtained as LEXAN FR25A from GE Plastics, Specialty Film and Sheet. Example 9 uses the halogen-free poly(arylene ether) composition of Table 1.

Property values are provided in Table 4. All films were tested at a thickness of 17 mils (432 micrometers), except for dielectric strength and break down voltage, which was tested at 10 mils (254 micrometers), and flammability, which was tested at multiple thicknesses, with the minimum thickness exhibiting the specified property being reported in Table 4.

A rating of V-0 in the UL 94 Vertical Burning Test requires that each individual specimen has a first a second flame-out ($t_1$) and a second flame-out time ($t_2$) time less than or equal to 10 seconds; the total of first and second flame-out times ($t_1$ and $t_2$) for all five specimens is less than or equal to 50 seconds; that the afterflame ($t_2$) plus afterglow ($t_3$) times for each individual specimen is less than or equal to 30 seconds; that no specimen exhibits an afterflame or afterglow up to the holding clamp; and that the cotton indicator is not ignited by flaming particles or drops. Films of various thicknesses were tested. Table 2 shows the thickness of the thinnest film to achieve a VTM-0 and V-0 ratings. For the Table 1 composition, the thinnest film tested, a 2 mil (51 micrometer) thickness, achieved the VTM-0 rating.

TABLE 4

|  | Comparative Example 1 | Comparative Example 2 | Example 9 |
|---|---|---|---|
| Base Resin | PP | PC | PPE |
| Halogen-Free? | No | No | Yes |
| Mechanical Properties | | | |
| Tensile Strength (MPa) | 29 | 70 | 61 |
| Initiation Tear Strength (N/mm) | 276 | 298 | 160 |

TABLE 4-continued

| | Comparative Example 1 | Comparative Example 2 | Example 9 |
|---|---|---|---|
| Propagation Tear Strength (N/mm) | 7.7 | 17 | 14 |
| Dynatup Total Energy (J) | 1.1 | 13.2 | 3.46 |
| Fold Endurance (double folds) | | | |
| MD | >100 | 30 | 10 |
| TD | >100 | 30 | 10 |
| Thermal Properties | | | |
| Glass Transition Temperature (° C.) | 265 (130) | 307 (153) | 340 (172) |
| Shrinkage at 130° C. (%) | 0.3 | 0.02 | 0.1 |
| Rating in UL94 Thin Material Vertical Burning Test | VTM-0 at 127 μm | VTM-0 at 76 μm | VTM-0 at 51 μm |
| UL94 rating in Vertical Burning Test | V-0 at 432 μm | V-0 at 254 μm | V-0 at 254 μm |
| Physical Properties | | | |
| Density (kg/m$^3$) | 1035 | 1344 | 1100 |
| Water Absorption, 23° C., 50% RH, 24 hrs (%) | 0.01 | 0.28 | 0.08 |
| Electrical Properties | | | |
| Dielectric Strength in oil, short time @ 23° C. (kV/mm) | 71 | 59 | 74 |
| Breakdown Voltage in oil @ 23° C. (V) | 18,000 | 15,000 | 19,380 |
| Dielectric Constant @ 1,000,000 Hz | 2.3 | 2.8 | 2.7 |
| Dissipation Factor @ 1,000,000 Hz | 0.0019 | 0.0117 | 0.0030 |

The results show that the poly(arylene ether) composition of Example 9 has the highest glass transition temperature, which will allow it to be used in higher temperature environments. The poly(arylene ether) composition of Example 9 also exhibits significantly higher tensile strength and puncture resistance than the polypropylene composition of Comparative Example 1, which permits the poly(arylene ether) film to be employed at lower thicknesses for the same puncture resistance. The poly(arylene ether) composition of Example 9 is also superior to the polypropylene composition of Comparative Example 1 in its flame resistance. The lowest thickness of a film exhibiting a V-0 value was 17 mils (432 micrometers) for the polypropylene composition and 10 mils (254 micrometers) for the poly(arylene ether) composition. This will allow the use of thinner poly(arylene ether) films to provide the same flame retardancy as a corresponding polypropylene film. Although the flame retardancies of the polycarbonate and poly(arylene ether) films are similar, only the poly(arylene ether) film is halogen-free.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. An electrically insulating film, comprising:
   about 60 to about 93 weight percent of a poly(arylene ether);
   about 3 to about 15 weight percent of a hydrogenated block copolymer of an alkenyl aromatic compound and a conjugated diene; wherein the hydrogenated block copolymer has a weight average molecular weight of about 200,000 to about 400,000 atomic mass units; and
   about 4 to about 15 weight percent of a triaryl phosphate;
   wherein the electrically insulating film is halogen-free;
   wherein the electrically insulating film has a thickness of about 50 to about 1050 micrometers; and
   wherein the electrically insulating film exhibits
      a flammability rating of VTM-0 measured according to according to the UL 94 Thin Material Vertical Burning Test at a thickness of 51 micrometers,
      a flammability rating of V-0 measured according to the UL 94 Vertical Burning Test at a thickness of 254 micrometers,
      a glass transition temperature greater than or equal to 100° C., and
      a breakdown voltage greater than or equal to 14,000 volts measured at 23° C. in oil at a thickness of 254 micrometers according to ASTM D149.

2. An electrically insulating film, comprising:
   about 60 to about 93 weight percent of a poly(arylene ether);
   about 3 to about 15 weight percent of a hydrogenated block copolymer of an alkenyl aromatic compound and a conjugated diene; wherein the hydrogenated block copolymer is a polystyrene-poly(ethylene-butylene)-polystyrene triblock copolymer; and
   about 4 to about 15 weight percent of a triaryl phosphate;
   wherein the electrically insulating film is halogen-free;
   wherein the electrically insulating film has a thickness of about 50 to about 1050 micrometers; and
   wherein the electrically insulating film exhibits
      a flammability rating of VTM-0 measured according to according to the UL 94 Thin Material Vertical Burning Test at a thickness of 51 micrometers,
      a flammability rating of V-0 measured according to the UL 94 Vertical Burning Test at a thickness of 254 micrometers,
      a glass transition temperature greater than or equal to 100° C., and
      a breakdown voltage greater than or equal to 14,000 volts measured at 23° C. in oil at a thickness of 254 micrometers according to ASTM D149.

3. An electrically insulating film, comprising:

about 80 to about 90 weight percent of a poly(2,6-dimethyl-1,4-phenylene ether) having an intrinsic viscosity of about 0.3 to about 0.6 deciliter per gram measured at 25° C. in chloroform;

about 4 to about 7 weight percent of a polystyrene-poly(ethylene-butylene)-polystyrene triblock copolymer having a weight average molecular weight of about 200,000 to about 400,000 atomic mass units;

about 6 to about 10 weight percent of resorcinol bis(diphenyl phosphate);

about 0.5 to about 1 weight percent of a linear low density polyethylene; and about 0.2 to about 0.8 weight percent of carbon black;

wherein the electrically insulating film has a thickness of about 50 to about 800 micrometers; and wherein the electrically insulating film exhibits a flammability rating of VTM-0 measured according to according to UL 94 at a thickness of 51 micrometers, a flammability rating of V-0 measured according to UL 94 at a thickness of 254 micrometers, a breakdown voltage greater than or equal to 14,000 volts measured at 23° C. in oil at a thickness of 254 micrometers according to ASTM D149, a Dynatup total energy value of about 2 to about 2.3 joules measured at a thickness of 254 micrometers according to ASTM D3763, and a fold endurance of about 80 to about 100 double folds in the machine direction measured at a thickness of 254 micrometers according to ASTM D2176.

* * * * *